018
United States Patent [19]

Obata et al.

[11] 3,982,004

[45] Sept. 21, 1976

[54] METHOD OF MANUFACTURING EDIBLE SOY PROTEIN-CONTAINING, SIMULATED MEAT PRODUCT

[75] Inventors: Shizuo Obata, Kashiwara; Yukiomi Yamato; Hitoshi Taniguchi, both of Osaka, all of Japan

[73] Assignee: Fuji Oil Company, Ltd., Japan

[22] Filed: Mar. 4, 1975

[21] Appl. No.: 555,130

[30] Foreign Application Priority Data

Mar. 11, 1974 Japan.............................. 49-28225

[52] U.S. Cl................................ 426/641; 426/104; 426/652; 426/656
[51] Int. Cl.²........................ A23L 1/31; A23J 3/00
[58] Field of Search .......... 426/364, 371, 372, 641, 426/650, 656, 104

[56] References Cited
UNITED STATES PATENTS

| | | |
|---|---|---|
| 2,952,542 | 9/1960 | Giddey............................ 426/656 X |
| 3,047,395 | 7/1962 | Rusoff et al. ....................... 426/104 |
| 3,482,998 | 12/1969 | Carroll et al....................... 426/346 |
| 3,662,671 | 5/1972 | Frederiksen et al................ 426/656 |
| 3,662,672 | 5/1972 | Hoer................................... 426/656 |

*Primary Examiner*—Raymond N. Jones
*Attorney, Agent, or Firm*—Wenderoth, Lind & Ponack

[57] ABSTRACT

A method for manufacturing an edible soy protein containing, simulated meat product containing a fibrous soy protein product of fibril structure having a random orientation, and non-textured protein material. A mixture of 90 to 50 % by weight of non-textured protein material i.e. a proteinaceous paste and 10 to 50 % by weight of the fibrous soy protein product is shaped and heat-treated, by which method, a small amount of the latter forms a supporting structure in the large amount of the former, thus producing simulated meat products having qualities which are comparable to high grade natural meats.

11 Claims, No Drawings

METHOD OF MANUFACTURING EDIBLE SOY PROTEIN-CONTAINING, SIMULATED MEAT PRODUCT

The present invention relates to a method of manufacturing edible simulated meat products and, more particularly, to a method of manufacturing simulated meat products composed of non-textured edible protein paste and soy protein products of fibril structure having a random orientation.

Conventionally, in the field of food, various sorts of edible simulated meat products composed of soy protein have been developed on a world wide scale, since the introduction of the manufacturing technique disclosed in U.S. Pat. No. 2,682,466 to R. A. Boyer. At present, a variety of edible simulated meat products which are broadly classified as fibrous soy protein products, produced by the known wet spinning method and textured soy protein products, produced by the pressurized swelling method, are commercially available. From the initial stage of development of such conventional simulated meat products up to the present, studies have been made with the object of substituting such inexpensive simulated meat products for expensive natural meat to as large an extent as possible, with the qualities of the simulated meat products rendered as close to those of high grade natural meat as possible.

However, it is the actual state of the art at present that the conventional simulated meat products of the above described type produced from soy protein, especially the textured soy protein products by the known wet spinning method can not necessarily compete with ground fish meat or minced or ground animal meat in price, although the cost of production of the same may be competitive with the price of high grade animal meat. Accordingly, instead of replacing high grade natural meat by such simulated meat products to a desirably large extent, it is considered very economical if simulated meat products fully competitive with high grade natural meat can be produced by largely employing ground fish meat or scrap animal meat cheaper than soy protein-containing food, preferably with a small amount of soy protein products added thereto.

Although many methods have conventionally been proposed by producing simulated meat products by the use of the fibrous soy protein products or textured soy protein products together with other natural meat, only a very few attempts have been made to produce such simulated meat products through joint use of the ground fish meat, and even in these few attempts, simulated meat products meeting the requirements somehow can not actually be obtained unless textured soy protein products are employed therein at more than 50 % by weight. This accounts for the difficulties involved in organizing the non-textured protein paste into a textured structure.

Accordingly, a essential object of the present invention is to provide a method of manufacturing edible soy protein-containing, simulated meat products which can fully compete with high grade animal meat in quality and which can be produced at reasonably low cost with substantial elimination of the disadvantages inherent in the conventional simulated meat products.

Another important object of the present invention is to provide edible soy protein containing, simulated meat products, wherein a small amount of particular soy protein product is added to non-textured proteinaceous paste of ground fish meat or ground or minced scrap meat to impart to such simulated meat products, a pleasing taste and sensation (in the mouth) comparable to that provided by a natural meat.

As a result of a series of experiments carried out by the present inventors, it was found that, by the employment of a small amount of a fibrous soy protein product of fibril structure having a random orientation, the proteinaceous paste can be made into a textured structure, and that desirable simulated meat products with a textured structure satisfactorily compete with natural animal meat and can be obtained with improved workability in processing.

According to the present invention, the non-textured proteinaceous paste and the fibrous soy protein product of fibril structure having a random orientation are mixed in a ratio of 90 to 50 % by weight of the former to 10 to 50 % by weight of the latter with subsequent kneading, shaping and heating, by which method, the fibrous soy protein product of fibril structure having a random orientation in relatively small amount, can form a supporting structure for the larger amount of proteinaceous paste, thus resulting in simulated meat products having qualities fully competitive with high grade animal meats by simple processing with consequent low manufacturing cost.

These and other objects and features of the present invention will become apparent from the following description taken in conjunction with a preferred embodiment thereof.

According to the method of the present invention, the fibrous soy protein product of fibril structure having a random orientation is employed as a base material for forming the proteinaceous paste into a textured structure. Such a fibrous soy protein product of the above-described type is distinguishable from the textured soy protein product produced by the known pressurized swelling method or the fibrous soy protein product produced by the known wet spinning method, and can mainly be obtained by heating a slurry of proteinaceous material through a heat exchanger under high pressure with subsequent cooling and pumping into a collecting zone so as to produce elongated filaments of multi-molecular protein polymers as disclosed in the U.S. Pat. Nos. 3,662,671 and 3,662,672 respectively.

In the present invention, should the textured soy protein product produced by the known pressurized swelling method or the fibrous soy protein product produced by the known wet spinning method be employed instead of the fibrous soy protein material of fibril structure having a random orientation, the object of the present invention cannot be achieved. In other words, the textured soy protein product by the known pressurized swelling method excessively lacks intertwining characteristics with the non-textured protein material, and the resultant products therefrom merely have such a construction such as that of boiled fish meat paste scattered therein with the textured soy protein material, which resultant products can hardly be called simulated meat products. Similarly, the fibrous soy protein products produced by the wet spining method do not offer satisfactory simulated meat products unless the former is employed as the major material with the proteinaceous paste being added thereto in a minor amount. Thus said wet spun product is unsuitable for use in a small quantity in the manufacture of the simulated meat products. Furthermore, when such simulated meat products mainly composed of the fibrous soy proteinaceous material produced by the known spinning method are bitten off, it is sometimes experienced that the proteinaceous fibers are drawn in bundles out of the meat-like products as in pulling threads therefrom, thus one is unable to avoid an impression that the products are merely artificial meat-like products. Additionally, with the decrease of the quantity of the fibrous soy protein material by the spinning method to be employed therein, toughness or hardness of the resultant products for imparting meat-like feel also decreases, resulting in unsatisfactory structure, and moreover, the original material kneaded with the proteinaceous paste before heating is so sticky as to easily adhere to the hands or the container, making the shaping operation of the products extremely difficult. These drawbacks inherent in the fibrous soy protein material by the known wet spinning method are considered to be due to the absence of the fibril structure having a random orientation therein. Since the fibrous soy proteinaceous material employed in the method of the present invention has a fibril or fine fibrous structure with a random orientation, a small quantity of the same can sufficiently form a supporting structure for a larger amount of the proteinaceous paste, as compared with the case wherein the same weight of the wet spun fibrous protein material is employed. In other words, the supporting structure of fibril protein material having a random orientation is considered to be in such a state in the product as to support therearound a certain amount of the proteinaceous paste as if the supporting structure took root in fine parts of the product construction with the proteinaceous paste thus supported being in turn supported by other portions of the supporting structure. By such construction, the resultant simulated meat products have sufficient toughness or hardness to chew with small amount of fibrous soy protein material employed therein, and the good intertwining characteristics thereof advantageously prevents the proteinaceous fibers from being drawn out of the final products when such products are to be bitten off. Similarly, the sticky characteristics of the proteinaceous paste tending to adhere to the hands and the container are considered to be improved by the reduced separability of the proteinaceous material from the supporting structure due to the excellent intertwining characteristics of the fibrous soy protein material of fibril structure having a random orientation.

In the present invention, the non-textured proteinaceous paste should be such a material as will gelate, as in the fish meat paste, when formed into a certain shape as is or molded, with subsequent heating, the resultant gelated material having uniform cross section. Among such materials are fish meat paste, such as fish meat paste a paste of minced or scrap mutton or chicken meats, and kneaded paste of separated soy protein mixed with water etc., which pastes may be added with one or a mixture of oil, water, seasoning materials, coloring agents, flavors and other additives, depending on the requirements. Especially the addition of oil is effective for further improvement of taste and sensation imparted to the mouth, in which case, it is desirable that the paste is in an emulsion formed by the mixture of such oil and proteinaceous material having excellent emulsifying characteristics, for example, isolated soy proteinaceous material.

According to the method of the present invention, the mixing ratio of the non-textured proteinaceous paste to the fibrous soy protein product is 90 to 50 % by weight of the former to 10 to 50 % by weight of the latter, in which ratio, if the amount of the fibrous soy protein product should be less than 10 % by weight, such fibrous soy protein is insufficient to become the supporting structure for the proteinaceous paste for the formation of the earlier mentioned satisfactory simulated meat products. On the other hand if the amount of the same should exceed 50 % by weight, the resultant simulated meat products are rendered too tough or hard from the viewpoint of sensation to the mouth as compared with natural edible meats. This results in simultaneous reduction in economy of manufacture, which advantage is one of the main features of the present invention.

The proteinaceous paste and the fibrous soy protein material of the fibril structure having a random orientation mixed in the ratio as described above are subsequently kneaded into a required shape and heated thereafter to produce the simulated meat food articles.

Comparative tests between simulated meat products employing fibrous soy proteinaceous material by the wet spinning method and those employing fibrous soy protein material of fibril structure having a random orientation are carried out as described hereinbelow.

Comparative tests

A fish meat paste was prepared by adding a small amount of salt to ground fish meat in a known meat mixer, 40 or 70 parts of which fish meat paste was mixed with 30 or 60 parts of a commercially available textured protein product (A) (moisture content 70 %), or of the fibrous soy protein product of fibril structure having a random orientation (B) "TEXTURED EDI-PRO 200" (moisture content 65 %) which is sold by Ralston Purina Company, U.S.A. with subsequent mixing and kneading thereof to form a homogeneous mixture (100 parts in total). The homogeneous mixture prepared in the manner described above was poured into cylinders or rings each having height of 30 mm and inner diameter of 70 mm in such a manner as to contain therein as little air as possible to form two groups of test specimens. One group of the specimens was tested for physical properties thereof after leaving the as is for 30 minutes, while the other group of the specimens was also tested for physical properties thereof after steaming the same in a known steamer for 10 minutes with subsequent cooling thereof for 60 minutes.

| starting material of soy protein | (A) textured or fibered soy protein by the wet spinning method | | (B) fibrous soy protein material of fibril structure having a random oritentation | |
|---|---|---|---|---|
| mixing ratio | 30 parts | 60 parts | 30 parts | 60 parts |
| Before heating | | | | |
| hardness | 1.35 | 2.05 | 1.75 | 5.40 |
| cohesiveness | 0.57 | 0.60 | 0.92 | 0.83 |
| gumminess | 0.77 | 1.35 | 1.61 | 4.48 |

| starting material of soy protein | (A) textured or fibered soy protein by the wet spinning method | | (B) fibrous soy protein material of fibril structure having a random orientation | |
|---|---|---|---|---|
| mixing ratio | 30 parts | 60 parts | 30 parts | 60 parts |
| penetration | 8.5 | 9.1 | 10.8 | 34.1 |
| After heating | | | | |
| hardness | 4.10 | 5.40 | 7.30 | 11.0 |
| cohesiveness | 0.59 | 0.51 | 0.79 | 0.63 |
| gumminess | 2.42 | 2.75 | 5.77 | 6.93 |
| penetration | 27.0 | 25.5 | 35.0 | 64.4 |

In the specimens prior to heating, each of the mixtures of 30 and 60 parts of the textured soy protein (A), and of 30 and 60 parts of the fibrous soy protein material of fibril structure having a random orientation (B), with respect to the starting soy protein material, showed greater stickiness with the increase of mixing ratio in the above order, and the latter mixture of the fibrous soy protein of fibril structure of a random orientation (B) showed superior workability.

Concerning the specimens after heating, the resultant products employing any of the above described soy protein materials (A) and (B) tend to have increased hardness with the increase of the mixing ratio of the soy protein material to be added to the starting material. It should be noted here that the final products having hardness less than 5 are too soft, while those having hardness more than 12 are too hard from the viewpoint of mouth sensation as compared with that of natural meats. To the mouth, the resultant simulated meat product employing 60 parts of the textured soy protein material (A) imparts a rather soft sensation, and that employing 60 parts of the fibrous soy protein material of fibril structure having a random orientation (B) imparts a rather hard sensation while that employing 30 parts of the fibrous soy protein material of fibril structure having a random orientation (B) gave the most favorable sensation to the mouth as compared with that of the natural meats.

The method of the present invention will become more apparent from the following examples which are chosen from many specific combinations which are possible to illustrate the invention and are not to be construed as limiting the scope of the invention.

EXAMPLE I

The fibrous soy protein product of fibril structure having a random orientation (TEXTURED EDI-PRO 200) was boiled in a broth of bonito to impart flavor thereto with subsequent reduction of water content to 67 %, 40 parts of which flavored protein product was mixed with 60 parts of minced fish meat in a known meat mixer for 3 minutes with the kneaded mixture of the two being subsequently shaped into a plate-like configuration which has a thickness of about 15 mm. This was subsequently steamed for 10 minutes at 100°C. The plate-like specimen thus treated was subsequently cut into small 15 mm cubes, which cubes were boiled down in a seasoning mixture of soy sauce, sugar, millet honey, and a sweat of Japanese sake, thus obtaining cooked cubes of simulated meat having favorable meat-like mouth sensation comparable with that of natural meats.

It should be noted here that the above described reduction of water content of the fibrous soy protein product after having been boiled in the broth should preferably be to a level in the region from 60 to 75 %, since if the water content thereof is less than 60 %, sufficient mixing is difficult and workability in processing is inferior, while if the water content thereof is more than 75 % level, resultant products may have less solidification with inferior integrity, being broken into pieces when heated in water or readily separated into pieces when placed in water.

EXAMPLE 2

10 kg of a mixture comprising 3 kg by weight of fibrous protein product of fibril structure having a random orientation (TEXTURED EDI-PRO 200), 2 kg by weight of chicken paste, and 5 kg by weight of a paste in the form of an emulsion composed of 10 parts by weight of isolated soy protein product which is sold by Fuji Oil Company, Ltd., Japan (Fuji PRO-R), 50 parts by weight of salad oil and 50 parts by weight of water, was kneaded for perfect mixing in a known manner for 3 minutes, which kneaded mixture was subsequently formed into an indefinite plate-like configuration. The kneaded mixture of indefinite plate-like configuration was crumbed and then heated in cooking oil for 5 minutes at a temperature of 170°C to produce a cutlet-like simulated meat product which satisfactorily competes with natural meat cutlets in taste and mouth-feel.

From the foregoing description of the present invention, it has now become clear that the employment of the fibrous soy protein product of fibril structure having a random orientation, for a non-textured protein product as a starting material, in a ratio of 10 to 50 % by weight of the former to 90 to 50 % by weight of the latter offers a simulated meat product fully comparable with natural meat in respect of mouth sensation, hardness to the teeth, taste and other properties with improved workability, low manufacturing cost and consequent low price.

Although the present invention has been fully described by way of examples, it is to be noted that various changes and modifications are apparent to those skilled in the art. Therefore, unless otherwise such changes and modifications depart from the scope of the present invention, they should be construed as included therein.

What is claimed is:

1. A method of manufacturing an edible soy protein containing, simulated meat product, which comprises mixing 10 to 50% by weight a fibrous soy protein product of fibril structure having a random orientation obtained by heating a slurry of proteinaceous material through a heat exchanger under high pressure with subsequent cooling and pumping into a collecting zone so as to produce elongated filaments of multi-molecular polymers with 90 to 50% by weight of a non-textured protein paste capable of gelation when heated, shaping the mixture of said fibrous soy protein product and said non-textured material and subsequently heat-treating said shaped mixture to produce said simulated meat product.

2. A method as claimed in claim 1, wherein the ratio of said protein product of fibril structure having a random orientation to said non-textured protein material is 40 parts by weight of the former to 60 parts by weight of the latter.

3. A method as claimed in claim 1, wherein said protein product of fibril structure having a random orientation is boiled in a broth of a natural meat prior to said mixing with subsequent reduction of water content thereof, said protein product of fibril structure being subsequently mixed with said non-textured protein material and said mixture is shaped with said shaped mixture being subsequently heat-treated, said heat-treated mixture being cut into a plurality of small cubes which are boiled with one or a mixture of seasoning agents.

4. A method as claimed in claim 1, wherein the ratio of said mixing of said soy protein product of fibril structure having a random orientation with said proteinaceous material is 3 parts by weight of the former to 5 parts by weight of the latter with addition of 2 parts by weight of a natural meat paste so as to form 10 parts by weight of a paste of said mixture, said non-textured material further comprising isolated soy protein product, salad oil and water, the ratio of said isolated soy protein product of said salad oil to said water being 1:5:5, said paste of said mixture being shaped into a flat configuration, with said shaped mixture, after having being crumbed, being boiled in an edible oil.

5. A method as claimed in claim 1, wherein said nontextured protein material is a paste of a natural meat.

6. A method as claimed in claim 1, wherein said nontextured protein material is a paste composed of an isolated soy protein and water.

7. A method as claimed in claim 1, wherein said nontextured protein material is a paste composed of an isolated soy protein and a natural meat.

8. A method as claimed in claim 1, wherein prior to said mixing step, one or more food additives including seasoning agents are added to said non-textured protein material.

9. A method as claimed in claim 1, wherein during said mixing step, one or more food additives including seasoning agents are added to said non-textured protein material.

10. A method as claimed in claim 1, wherein said heat treatment is performed by steaming for 10 minutes at 100°C.

11. A process according to claim 1, wherein said heat treatment is performed by cooking in oil at a temperature of about 170°C for 5 minutes.

* * * * *